Nov. 14, 1939.   W. R. WEAVER   2,180,184
RIFLE TELESCOPE SIGHT
Filed March 31, 1937   3 Sheets-Sheet 1
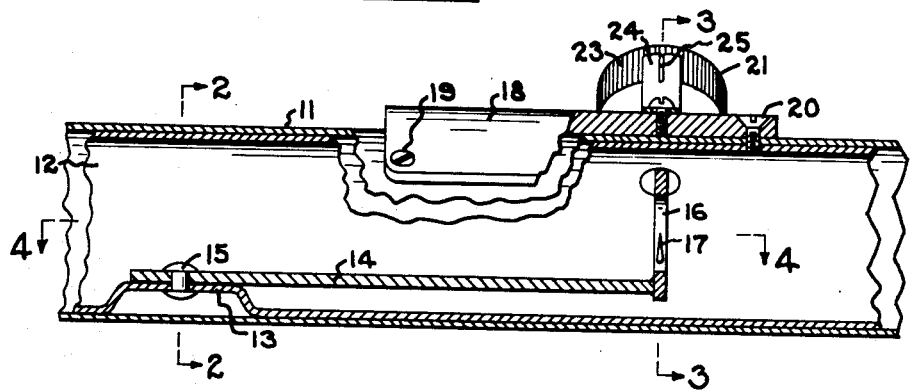
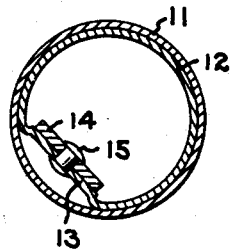
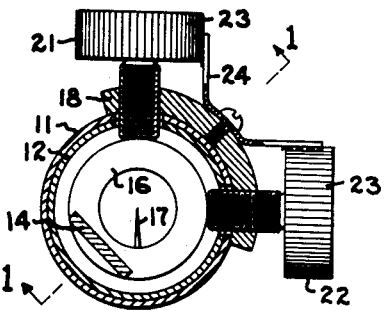
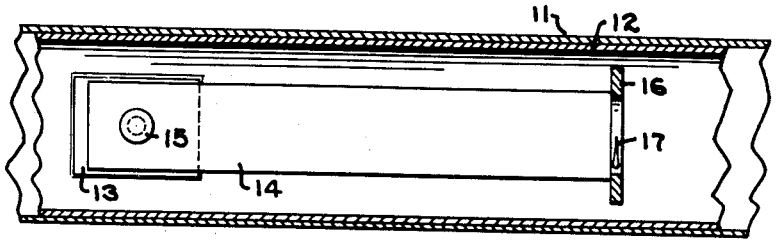
INVENTOR.
WILLIAM R. WEAVER.
BY
ATTORNEY.

Nov. 14, 1939.                W. R. WEAVER                2,180,184
                           RIFLE TELESCOPE SIGHT
                          Filed March 31, 1937         3 Sheets-Sheet 2
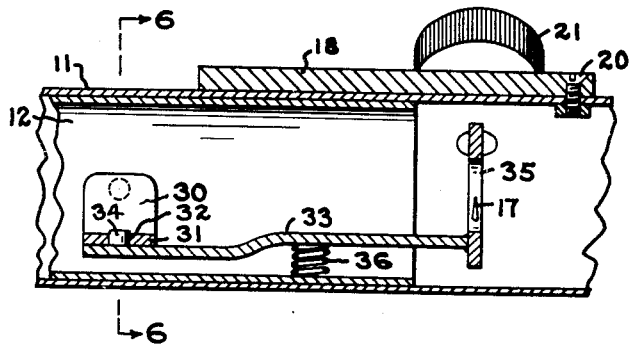
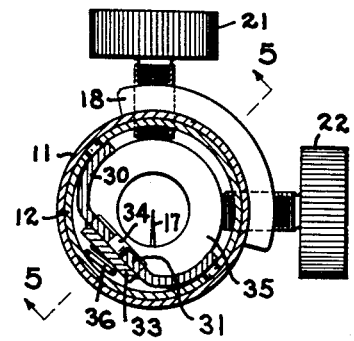
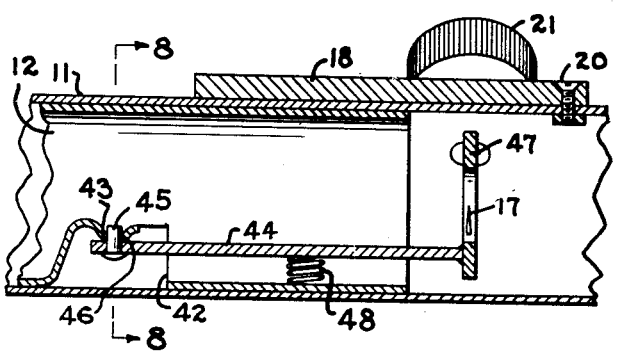
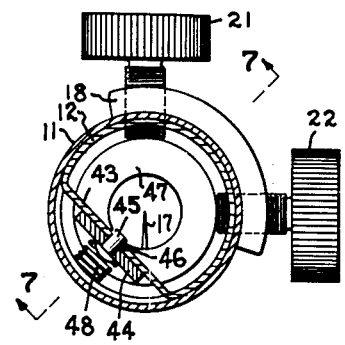
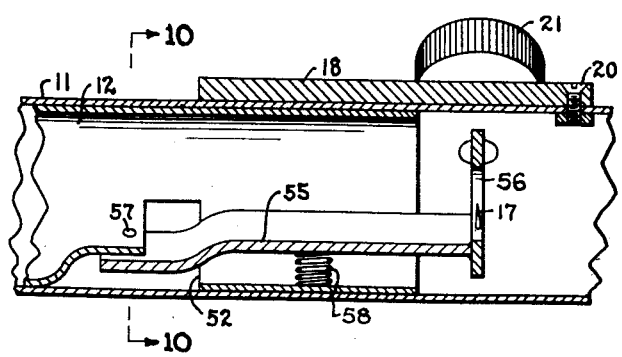
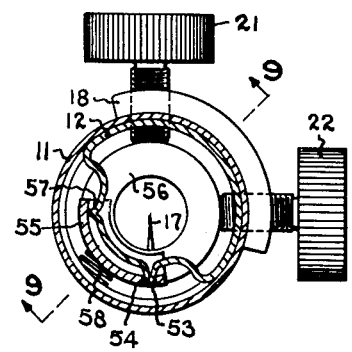
INVENTOR.
WILLIAM R. WEAVER.
BY
ATTORNEY.

Nov. 14, 1939.                  W. R. WEAVER                    2,180,184
                             RIFLE TELESCOPE SIGHT
                          Filed March 31, 1937          3 Sheets-Sheet 3
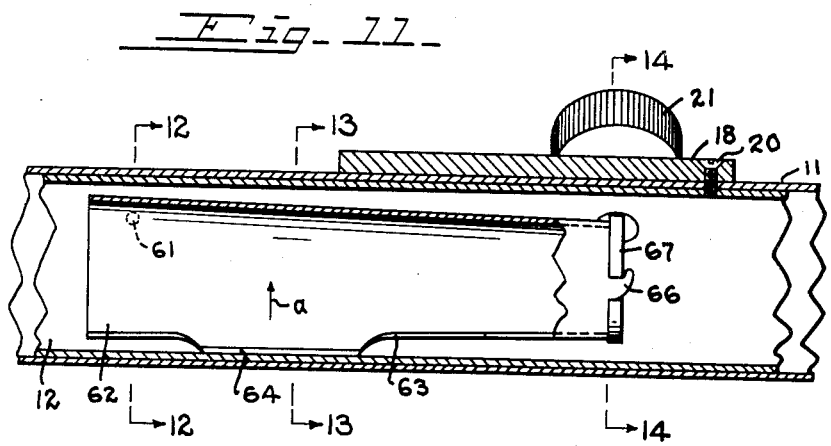
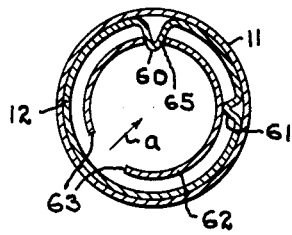 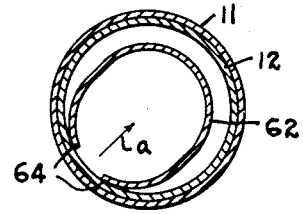
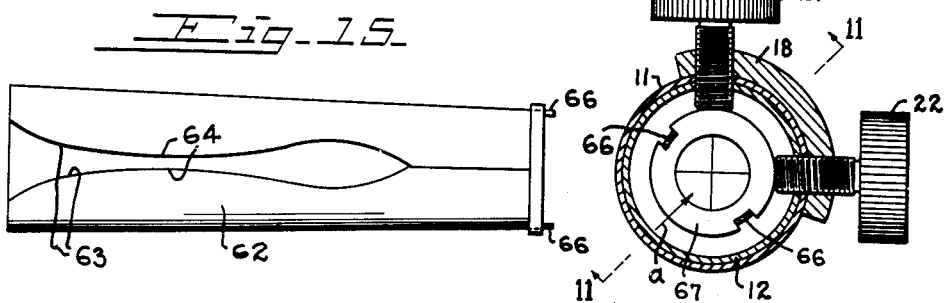
INVENTOR.
WILLIAM R. WEAVER.
BY
*H. C. Karel.*
ATTORNEY.

Patented Nov. 14, 1939

2,180,184

UNITED STATES PATENT OFFICE 2,180,184

RIFLE TELESCOPE SIGHT

William R. Weaver, El Paso, Tex.

Application March 31, 1937, Serial No. 134,134

2 Claims. (Cl. 33—50)

My invention relates to a new and useful telescope sight for use in connection with fire arms and more particularly to the means employed for supporting the reticule within the telescope and adjusting the same for windage and elevation.

The object of my invention is to provide a pivoted supporting member mounted within the scope and having the reticule mounted thereon, with adjusting screws bearing against the reticule mounting on each side of the point of pivot with the screws spaced at right angles.

A further object is to so construct the mounting that adjustment of either screw will cause the supporting member to move on its pivot as well as flex to maintain the reticule in desired adjustment.

A still further object is to provide simple means for holding the adjusting screws in adjusted position.

My invention will be further readily understood from the following description and claims, and from the drawings, in which latter:

Fig. 1 is a longitudinal section of a portion of a telescope, with my improvements mounted therein, taken in the plane of the line 1—1 of Fig. 3, and partly broken away.

Fig. 2 is a cross-sectional view of the same, taken in the plane of the line 2—2 of Fig. 1.

Fig. 3 is a cross-sectional view of the same, taken in the plane of the line 3—3 of Fig. 1.

Fig. 4 is a longitudinal section of the same, taken in the plane of the line 4—4 of Fig. 1.

Fig. 5 is a longitudinal section of a modified form of mounting, taken in the plane of the line 5—5 of Fig. 6.

Fig. 6 is a cross-sectional view of the same, taken in the plane of the line 6—6 of Fig. 5.

Fig. 7 is a longitudinal section of a further modified form of mounting, taken in the plane of the line 7—7 of Fig. 8.

Fig. 8 is a cross-sectional view of the same, taken in the plane of the line 8—8 of Fig. 7.

Fig. 9 is a longitudinal section of a further modified form of mounting, taken in the plane of the line 9—9 of Fig. 10.

Fig. 10 is a cross-sectional view of the same, taken in the plane of the line 10—10 of Fig. 9.

Fig. 11 is a longitudinal section of a further modified form of mounting, taken in the plane of the line 11—11 of Fig. 14.

Fig. 12 is a cross-sectional view of the same, taken in the plane of the line 12—12 of Fig. 11.

Fig. 13 is a cross-sectional view of the same, taken in the plane of the line 13—13 of Fig. 11.

Fig. 14 is a cross-sectional view of the same, taken in the plane of the line 14—14 of Fig. 11, and Fig. 15 is a bottom view of the inner pivoted member.

In my improved construction, the telescope 11 is secured to the gun in any suitable manner whereby it will be held in substantially parallel relation to the gun barrel. Within the telescope is a sleeve 12 having a raised flat portion 13. A spring member 14 is pivoted on the flat portion 13 by means of a pivot pin 15. At the forward end of the member 14 is a ring 16 extending upwardly for supporting the reticule 17, herein shown as a pin with its point in the center of the ring, but which may be any conventional type of reticule.

A reinforcing member 18 is secured to the telescope as by screws 19 and 20, or may be welded thereto. The screws extend into the sleeve for positioning the sleeve and holding it in place within the telescope. A pair of adjusting screws 21 and 22 spaced ninety degrees apart are threaded into the reinforcing member with the ends of the screws bearing against the reticule supporting ring. The adjusting screws are positioned equal distances on each side of the vertical centerline of the pivoted tension member 14. The telescope is secured to the gun with one of the adjusting screws in a vertical position and the other in a horizontal position. The tension member 14 urges the reticule ring toward the screws and adjustment of the screw 21 inwardly causes the tension member to flex and also move about its pivot for adjusting the elevation of the sight. Turning the screw 22 inwardly causes the tension member to flex and move in the opposite direction about the pivot for adjusting the sight for windage. The periphery of the screw heads are grooved as at 23 and suitable spring clips 24 having detents 25 bear against the screw heads to hold the screws in adjusted position.

In Figs. 5 and 6, I have shown a modified form of mounting which comprises a cradle 30 pivoted in the sleeve 12 and having a flat portion 31 provided with an aperture 32. An arm 33 has a pin 34 at one end, being received in the aperture 32. The reticule ring 35 is secured to the extending end of the arm. A coil spring 36 between the arm and sleeve urges the arm upwardly for maintaining the reticule ring in contact with the adjusting screws. Thus adjustment of the screws 21 and 22 will cause the arm to move about the pivot pin 34, and up or down under the tension of the spring 36.

In Figs. 7 and 8, I have shown a further modification of my improved mounting. In this form, the sleeve 12 is cut out as at 42 and formed to present a flat pivotal surface 43. The reticule supporting arm 44 has a pivot pin 45 at one end received in an aperture 46 in the sleeve. The arm supports the reticule ring 47 at the other end. A spring 48 urges the arm and ring upwardly against the adjusting screws.

In Figs. 9 and 10, I have shown a still further modification, wherein the sleeve 12 is cut out as at 52 and is formed to provide a pivot 53 received in an aperture 54 in the reticule supporting arm 55 which has the reticule ring 56 at its other end. In this form the supporting arm is curved to lie within the scope and a lug 57 opposite the pivot point in the sleeve acts as a bearing for the arm. A coil spring 58 exerts an upward pressure on the arm for maintaining the reticule ring against the adjusting screws.

In Figs. 11 to 15 inclusive, I have shown a still further modification wherein the sleeve 12 is provided with an inwardly extending pivot 60 and a supporting lug 61. In this modification the reticule supporting member 62 is formed in the shape of a tapered sleeve having spaced apart lower extremities 63, a portion of which is arranged to engage the sleeve as indicated at 64 for normally urging the reticule support in the direction of the arrow $a$. The pivot 60 extends into an aperture 65 in the member 62. The forward end of this support is provided with a pair of hooks 66 over which the reticule supporting ring 67 is placed. The adjusting screws 21 and 22 bear against the ring 67 against the tension of the portion 64 of the support for adjusting the reticule for elevation and windage. It will be noted that in this form the support forms its own tension member and creates a tension on the reticule ring in a direction bisecting the center lines of the adjusting screws, and as the adjustment is made the tube also pivots on the pivot 60 supported on the lug 61.

It will be noted that in Figs. 1 to 4, the sleeve is shown as extending throughout the length of the telescope for separating the lenses, which are not shown. While in Figs. 5 to 10, the sleeve is shown as extending a portion of the way through the telescope. It will also be apparent that this sleeve may be a tubular member or split lengthwise for economical manufacture, or the sleeve may be dispensed with and the supporting arm or tube may be pivoted to the telescope housing or a suitable support within the telescope.

Further, it will be apparent from the foregoing description, that my improved construction permits accuracy of adjustment without the necessity of maintaining extreme accuracy in the parts.

Having thus fully described my invention, what I claim as new and desire to secure by Letters Patent, is:

1. A gun telescope sight mounting comprising a member pivoted in the telescope, said member movable on said pivot in one direction transversely of said telescope and flexible in the transverse direction normal to said first direction, a reticule supported on said member, mutually normal adjusting screws carried by and extending transversely of said telescope, the pivoted member extending longitudinally of said telescope and being engaged by said screws whereby adjustment of said screws will cause said member to flex in one direction and move on said pivot in the other direction.

2. A gun telescope sight mounting comprising a sleeve within the telescope, a member pivoted in the sleeve, said member movable on said pivot in one direction transversely of said telescope and flexible in the transverse direction normal to said first direction, a reticule supported on said member, mutually normal adjusting screws carried by and extending transversely of said telescope, the pivoted member extending longitudinally of said telescope and being engaged by said screws whereby adjustment of said screws will cause said member to flex in one direction and move on said pivot in the other direction, and means for maintaining said adjusting screws in adjusted position.

WILLIAM R. WEAVER.